US012019808B2

(12) United States Patent
Winters, IV et al.

(10) Patent No.: US 12,019,808 B2
(45) Date of Patent: Jun. 25, 2024

(54) INERTIAL SENSING OF TONGUE GESTURES

(71) Applicant: Microsoft Technology Licensing, LLC, Redmond, WA (US)

(72) Inventors: Raymond Michael Winters, IV, Seattle, WA (US); Tan Gemicioglu, Atlanta, GA (US); Thomas Matthew Gable, Seattle, WA (US); Yu-Te Wang, Redmond, WA (US); Ivan Jelev Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/075,786

(22) Filed: Dec. 6, 2022

(65) Prior Publication Data

US 2024/0085985 A1    Mar. 14, 2024

Related U.S. Application Data

(60) Provisional application No. 63/404,771, filed on Sep. 8, 2022.

(51) Int. Cl.
| | |
|---|---|
| *G06F 3/01* | (2006.01) |
| *G01S 13/56* | (2006.01) |
| *G06N 20/00* | (2019.01) |

(52) U.S. Cl.
CPC .............. *G06F 3/017* (2013.01); *G01S 13/56* (2013.01); *G06N 20/00* (2019.01)

(58) Field of Classification Search
CPC .......... G06F 3/017; G06N 20/00; G01S 13/56
See application file for complete search history.

(56) References Cited

U.S. PATENT DOCUMENTS

| | | | |
|---|---|---|---|
| 2020/0363871 A1 | 11/2020 | Vu et al. | |
| 2020/0371599 A1 | 11/2020 | Lee | |
| 2022/0004251 A1* | 1/2022 | Vega Gálvez | .......... H04W 4/38 |
| 2022/0206986 A1* | 6/2022 | Vega Galvez | ......... G09B 21/00 |
| 2022/0287215 A1* | 9/2022 | Jones | ................... A01B 59/004 |

OTHER PUBLICATIONS

Bleichner, et al., "Classification of Mouth Movements using 7 T fMRI", In Journal of Neural Engineering, vol. 12, Issue 6, Nov. 17, 2015, 8 Pages.
Chen, et al., "Understanding the Design Space of Mouth Microgestures", In Proceedings of Designing Interactive Systems Conference, Jun. 28, 2021, pp. 1068-1081.
Cheng, et al., "On the Tip of my Tongue—A Non-Invasive Pressure-Based Tongue Interface", In Proceedings of the 5th Augmented Human International Conference, Mar. 7, 2014, 4 Pages.

(Continued)

*Primary Examiner* — David E Choi
(74) *Attorney, Agent, or Firm* — Rainier Patents, P.S.

(57) ABSTRACT

This document relates to employing tongue gestures to control a computing device, and training machine learning models to detect tongue gestures. One example relates to a method or technique that can include receiving one or more motion signals from an inertial sensor. The method or technique can also include detecting a tongue gesture based at least on the one or more motion signals, and outputting the tongue gesture.

21 Claims, 18 Drawing Sheets

(56) References Cited

OTHER PUBLICATIONS

Gao, et al., "EchoWhisper: Exploring an Acoustic-based Silent Speech Interface for Smartphone Users", In Proceedings of the ACM on Interactive, Mobile, Wearable and Ubiquitous Technologies, vol. 4, Issue 3, Sep. 4, 2020, 27 Pages.
Goel, et al., "Tongue-in-Cheek: Using Wireless Signals to Enable Non-Intrusive and Flexible Facial Gestures Detection", In Proceedings of the 33rd Annual ACM Conference on Human Factors in Computing Systems, Apr. 18, 2015, pp. 255-258.
Kapur, et al., "AlterEgo: A Personalized Wearable Silent Speech Interface", In Proceedings of 23rd International Conference on Intelligent User Interfaces, Mar. 7, 2018, pp. 43-53.
Kimura, et al., "SilentSpeller: Towards mobile, hands-free, silent speech text entry using electropalatography", In Proceedings of the CHI Conference on Human Factors in Computing Systems, Apr. 29, 2022, 19 Pages.
Liu, et al., "Tongible: a non-contact tongue-based interaction technique", In Proceedings of the 14th international ACM SIGACCESS conference on Computers and accessibility, Oct. 22, 2012, pp. 233-234.
Masai, et al., "Face Commands—User-Defined Facial Gestures for Smart Glasses", In Proceedings of IEEE International Symposium on Mixed and Augmented Reality, Nov. 9, 2020, pp. 374-386.
Mohammadi, et al., "A pilot study on a novel gesture-based tongue interface for robot and computer control", In Proceedings of IEEE 20th International Conference on Bioinformatics and Bioengineering, Oct. 26, 2020, pp. 906-913.
Nakao, et al., "Make-a-face: a hands-free, non-intrusive device for tongue/mouth/cheek input using EMG", In Proceedings of ACM SIGGRAPH Posters, Aug. 12, 2018, 2 Pages.
Nam, et al., "Glossokinetic Potentials for a Tongue-Machine Interface: How Can We Trace Tongue Movements with Electrodes?", In Journal of IEEE Systems, Man, and Cybernetics Magazine, vol. 2, Issue 1, Jan. 2016, pp. 6-13.
Nam, et al., "GOM-Face: GKP, EOG, and EMG-Based Multimodal Interface With Application to Humanoid Robot Control", In Journal of IEEE Transactions on Biomedical Engineering, vol. 61, Issue 2, Feb. 2014, pp. 453-462.
Nguyen, et al., "TYTH-Typing on Your Teeth: Tongue-Teeth Localization for Human-Computer Interface", In Proceedings of the 16th Annual International Conference on Mobile Systems, Applications, and Services, Jun. 10, 2018, pp. 269-282.
Niu, et al., "Tongue-able interfaces: Prototyping and evaluating camera based tongue gesture input system", In Journal of Smart Health, vol. 11, Jan. 2019, pp. 16-28.
Pandey, et al., "LipType: A Silent Speech Recognizer Augmented with an Independent Repair Model", In Proceedings of the CHI Conference on Human Factors in Computing Systems, May 8, 2021, 19 Pages.
Saponas, et al., "Optically sensing tongue gestures for computer input", In Proceedings of the 22nd annual ACM symposium on User interface software and technology, Oct. 4, 2009, pp. 177-180.
Sasaki, et al., "Tongue interface based on surface EMG signals of suprahyoid muscles", In Robomech Journal, vol. 3, Issue 1, Apr. 2, 2016, 11 Pages.
Shen, et al., "Mouth Haptics in VR using a Headset Ultrasound Phased Array", In Proceedings of the CHI Conference on Human Factors in Computing Systems, Apr. 29, 2022, 14 Pages.
Sun, et al., "Lip-Interact: Improving Mobile Device Interaction with Silent Speech Commands", In Proceedings of the 31st Annual ACM Symposium on User Interface Software and Technology, Oct. 14, 2018, pp. 581-593.
Tatzgern, et al., "AirRes Mask: A Precise and Robust Virtual Reality Breathing Interface Utilizing Breathing Resistance as Output Modality", In Proceedings of the CHI Conference on Human Factors in Computing Systems, Apr. 29, 2022, 14 Pages.

Xu, et al., "Enabling Hand Gesture Customization on Wrist-Worn Devices", In Proceedings of the CHI Conference on Human Factors in Computing Systems, Apr. 29, 2022, 19 Pages.
Zhang, et al., "Non-Intrusive Tongue Machine Interface", In Proceedings of the SIGCHI Conference on Human Factors in Computing Systems, Apr. 26, 2014, pp. 2555-2558.
Ando, et al., 2017, "CanalSense: Face-Related Movement Recognition System based on Sensing Air Pressure in Ear Canals," In Proceedings of the 30th Annual ACM Symposium on User Interface Software and Technology (UIST '17), Association for Computing Machinery, New York, NY, USA, 679-689.
Bedri, et al., 2017, "EarBit: Using Wearable Sensors to Detect Eating Episodes in Unconstrained Environments," Proceedings of the ACM on Interactive, Mobile, Wearable and Ubiquitous Technologies 1, 3 (Sep. 2017), 1-20.
Majaranta et al., 2014, "Eye Tracking and Eye-Based Human-Computer Interaction," Springer London, London, 39-65.
Jin, et al., 2022, "EarCommand: "Hearing" Your Silent Speech Commands In Ear," Proceedings of the ACM on Interactive, Mobile, Wearable and Ubiquitous Technologies 6, 2 (Jul. 2022), 57:1-57:28.
Li et al., 2018, "Buccal: low-cost cheek sensing for inferring continuous jaw motion in mobile virtual reality," In Proceedings of the 2018 ACM International Symposium on Wearable Computers (ISWC '18), Association for Computing Machinery, New York, NY, USA, 180-183.
Elmadjian et al., 2021, "GazeBar: Exploiting the Midas Touch in Gaze Interaction," In Extended Abstracts of the 2021 CHI Conference on Human Factors in Computing Systems (Yokohama, Japan) (CHI EA '21). Association for Computing Machinery, New York, NY, USA, Article 248, 7 pages.
Istance, et al., 2008, "Snap Clutch, a Moded Approach to Solving the Midas Touch Problem," In Proceedings of the 2008 Symposium on Eye Tracking Research & Applications (Savannah, Georgia) (ETRA '08), Association for Computing Machinery, New York, NY, USA, 221-228.
Jacob et al., 2003, "Commentary on Section 4—Eye Tracking in Human-Computer Interaction and Usability Research: Ready to Deliver the Promises," In The Mind's Eye, J. Hyönä, R. Radach, and H. Deubel (Eds.), NorthHolland, Amsterdam, 573-605.
Gemicioglu, et al., Sep. 2022, "Tongue Gestures for Hands-Free Interaction in Head Worn Displays," In Adjunct Proceedings of the 2022 ACM International Joint Conference on Pervasive and Ubiquitous Computing and the 2022 ACM International Symposium on Wearable Computers (pp. 38-40).
Gemicioglu, et al., Apr. 2023, "Gaze & Tongue: A Subtle, Hands-Free Interaction for Head-Worn Devices," In Extended Abstracts of the 2023 CHI Conference on Human Factors in Computing Systems (pp. 1-4).
Gemicioglu, et al., Oct. 2023, "TongueTap: Multimodal Tongue Gesture Recognition with Head-Worn Devices," In Proceedings of the 25th International Conference on Multimodal Interaction (pp. 564-573).
"International Search Report and Written Opinion issued in PCT Application No. PCT/US2023/030028", Mailed Date: Oct. 30, 2023, 13 Pages.
Sebkhi, et al., "Inertial Measurements for Tongue Motion Tracking Based on Magnetic Localization With Orientation Compensation", In Journal of IEEE Sensors, vol. 21, Issue 6, Dec. 22, 2020, pp. 7964-7971.
"Eye tracking on HoloLens 2," Mixed Reality, Retrieved from internet URL:—https://learn.microsoft.com/en-us/windows/mixed-reality/design/eye-tracking, 2022, 08 Pages.
Asano, et al., "HMDspeller: Fast and Hands-free Text Entry System for Head Mount Displays using Silent Spelling Recognition," Extended Abstracts of the 2023 CHI Conference on Human Factors in Computing Systems, Apr. 19, 2023.
Augereau, et al., "An Open Platform for Research about Cognitive Load in Virtual Reality," IEEE Conference on Virtual Reality and 3D User Interfaces Abstracts and Workshops, 2022, pp. 54-55.
Beach, et al., "Eye tracker system for use with head mounted displays," International Conference on Systems, Man, and Cybernetics, vol. 05, 1998, pp. 4348-4352.

(56) References Cited

OTHER PUBLICATIONS

Bulling, et al., "It's in Your Eyes Towards Context-Awareness and Mobile HCI Using Wearable EOG Goggles," ACM International Conference Proceeding Series 344, 2008, 12 Pages.

Cascon, et al., "ChewIt. An Intraoral Interface for Discreet Interactions," CHI Conference on Human Factors in Computing Systems, 2019, 13 Pages.

Caudell, et al., "Augmented reality: an application of heads-up display technology to manual manufacturing processes," Boeing Computer Services, Research and Technology, 1992, vol. 2, pp. 659-669.

Chen, et al., "C-Face: Continuously Reconstructing Facial Expressions by Deep Learning Contours of the Face with Ear-mounted Miniature Cameras," Proceedings of the 33rd Annual ACM Symposium on User Interface Software and Technology, 2020, pp. 112-125.

Denby, et al., "Silent Speech Interfaces," Speech Communication 52, vol. 04, Apr. 4, 2010, pp. 270-287.

Dhuliawala, et al., "Smooth Eye Movement Interaction using EOG Glasses," 18th ACM International Conference on Multimodal Interaction, 2016, pp. 307-311.

Dybdal, et al., "Gaze Input for Mobile Devices by Dwell and Gestures," Symposium on Eye Tracking Research and Applications, 2012, pp. 225-228.

Fisher, et al., "Virtual environment display system," Interactive 3D Graphics, 1986, pp. 77-87.

Galvez, et al., "Byte.It: Discreet Teeth Gestures for Mobile Device Interaction," Association for Computing Machinery, 2019, 06 Pages.

Grimson, et al., "An automatic registration method for frameless stereotaxy, image guided surgery, and enhanced reality visualization," IEEE Transactions on Medical Imaging, vol. 15, Issue No. 2, Apr. 1996, pp. 129-140.

Guo, et al., "Toward Silent-Speech Control of Consumer Wearables," Computer 48, vol. 10, Oct. 2015, pp. 54-62.

Hart, et al., "Development of NASA-TLX (Task Load Index): Results of Empirical and Theoretical Research," Human Mental Workload, vol. 52, 1988, pp. 139-183.

Jingu, et al., "LipIO: Enabling Lips as both Input and Output Surface," Proceedings of the 2023 CHI Conference on Human Factors in Computing Systems, 2023, 14 Pages.

Kaeseler, et al., "Feature and Classification Analysis for Detection and Classification of Tongue Movements from Single-Trial Pre-Movement EEG," IEEE Engineering in Medicine and Biology Society, 2022, pp. 678-687.

Kaseler, et al., "Detection and classification of tongue movements from single-trial EEG," 20th International Conference on Bioinformatics and Bioengineering, 2020, pp. 376-379.

Khanna, et al., "JawSense: Recognizing Unvoiced Sound using a Low-cost Ear-worn System," Association for Computing Machinery, 2021, pp. 44-49.

Kimura, et al., "SottoVoce: An Ultrasound Imaging-Based Silent Speech Interaction Using Deep Neural Networks," Proceedings of the 2019 CHI Conference on Human Factors in Computing Systems, 2019, 10 Pages.

Koo, et al., "Immersive BCI with SSVEP in VR Head-Mounted Display," Engineering in Medicine and Biology Society, 2015, pp. 1103-1106.

Kothe, et al., "The Lab Streaming Layer for Synchronized Multimodal Recording," 2014, 11 Pages.

Kowaleski, Jason, "BlueMuse," Aug. 19, 2017.

Krigolson, et al., "Choosing MUSE: Validation of a Low-Cost, Portable EEG System for ERP Research," Frontiers in Neuroscience, vol. 11, Mar. 10, 2017, 10 Pages.

Li, et al., "EarIO: A Low-power Acoustic Sensing Earable for Continuously Tracking Detailed Facial Movements," Proceedings of the ACM on Interactive, Mobile, Wearable and Ubiquitous Technologies, vol. 6, Issue No. 2, 2022, 24 Pages.

Li, et al., "TongueBoard: An Oral Interface for Subtle Input," Google Research & Machine Intelligence, Mar. 2019, 09 Pages.

Majaranta, et al., "Fast gaze typing with an adjustable dwell time," Tampere Unit for Computer-Human Interaction, 2009, pp. 357-360.

Martisius, et al., "A Prototype SSVEP Based Real Time BCI Gaming System," Computational Intelligence and Neuroscience, 2016, 16 Pages.

Matthies, et al., "A Novel In-Ear Electric Field Sensing to Enrich Wearable Gesture Input through Facial Expressions," Association for Computing Machinery, May 2017, pp. 1911-1922.

Rief, et al., "Pick-by-vision: augmented reality supported order picking," The Visual Computer, vol. 25, May 2009, pp. 461-467.

Roddiger, et al., "Sensing with Earables: A Systematic Literature Review and Taxonomy of Phenomena," Wearable and Ubiquitous Technologies, vol. 6, Issue No. 3, Sep. 2022, 57 Pages.

Sahni, et al., "The Tongue and Ear Interface: A Wearable System for Silent Speech Recognition," International Symposium on Wearable Computers, 2014, pp. 47-54.

Srivastava, et al., "MuteIt: Jaw Motion Based Unvoiced Command Recognition Using Earable, " Wearable Ubiquitous Technologies, vol. 6, Issue No. 3, Sep. 2022, 26 Pages.

Sun, et al., "TeethTap: Recognizing Discrete Teeth Gestures Using Motion and Acoustic Sensing on an Earpiece," 26th International Conference on Intelligent User Interfaces, 2021, pp. 161-169.

Tuisku, et al., "Wireless Face Interface: Using voluntary gaze direction and facial muscle activations for human-computer interaction," Interacting with Computers, vol. 24, Jan. 2012, 09 Pages.

Ware, et al., "An evaluation of an eye tracker as a device for computer input," onference on Human Factors in Computing Systems and Graphics Interface, 1987, pp. 183-188.

Wolpaw, et al., "Brain-computer interfaces for communication and control," International Federation of Clinical Neurophysiology, Jun. 2002, pp. 767-791.

Zhang, et al., "EchoSpeech: Continuous Silent Speech Recognition on Minimally Obtrusive Eyewear Powered by Acoustic Sensing," Conference on Human Factors in Computing Systems, 2023, 18 Pages.

Zhang, et al., "SpeeChin: A Smart Necklace for Silent Speech Recognition," Proceedings of the ACM on Interactive, Mobile, Wearable and Ubiquitous Technologies, vol. 5, Issue No. 4, Dec. 2022, 23 Pages.

\* cited by examiner

BITE

LEFT CHEEK

USER-DEPENDENT CONFUSION MATRIX 1000

| | Blink | Stick Out Tongue | Single Tap Teeth | Double Tap Teeth | Swing Tongue Sideways | Curl Towards Back | Left Cheek | Right Cheek | Mouth Floor | Bite Tongue |
|---|---|---|---|---|---|---|---|---|---|---|
| Blink | 93.3% (56) | 0.0% (0) | 1.7% (1) | 1.7% (1) | 0.0% (0) | 0.0% (0) | 0.0% (0) | 3.3% (2) | 0.0% (0) | 0.0% (0) |
| Stick Out Tongue | 0.0% (0) | 91.2% (52) | 5.3% (3) | 0.0% (0) | 0.0% (0) | 0.0% (0) | 0.0% (0) | 3.5% (2) | 0.0% (0) | 0.0% (0) |
| Single Tap Teeth | 0.0% (0) | 0.0% (0) | 100% (60) | 0.0% (0) | 0.0% (0) | 0.0% (0) | 0.0% (0) | 0.0% (0) | 0.0% (0) | 0.0% (0) |
| Double Tap Teeth | 0.0% (0) | 0.0% (0) | 0.0% (0) | 95.0% (57) | 5.0% (3) | 0.0% (0) | 0.0% (0) | 0.0% (0) | 0.0% (0) | 0.0% (0) |
| Swing Tongue Sideways | 0.0% (0) | 1.7% (1) | 0.0% (0) | 0.0% (0) | 81.7% (49) | 0.0% (0) | 0.0% (0) | 3.3% (2) | 13.3% (8) | 0.0% (0) |
| Curl Towards Back | 0.0% (0) | 5.0% (3) | 0.0% (0) | 0.0% (0) | 0.0% (0) | 88.3% (53) | 1.7% (1) | 1.7% (1) | 0.0% (0) | 3.3% (2) |
| Left Cheek | 0.0% (0) | 0.0% (0) | 0.0% (0) | 0.0% (0) | 0.0% (0) | 0.0% (0) | 100% (60) | 0.0% (0) | 0.0% (0) | 0.0% (0) |
| Right Cheek | 0.0% (0) | 1.7% (1) | 1.6% (1) | 0.0% (0) | 0.0% (0) | 0.0% (0) | 3.3% (2) | 95.0% (57) | 0.0% (0) | 0.0% (0) |
| Mouth Floor | 0.0% (0) | 0.0% (0) | 0.0% (0) | 0.0% (0) | 0.0% (0) | 0.0% (0) | 0.0% (0) | 0.0% (0) | 100% (60) | 0.0% (0) |
| Bite Tongue | 0.0% (0) | 0.0% (0) | 0.0% (0) | 0.0% (0) | 0.0% (0) | 1.7% (1) | 0.0% (0) | 0.0% (0) | 0.0% (0) | 98.3% (59) |

FIG. 10

USER-INDEPENDENT CONFUSION MATRIX 1100

|  | Blink | Stick Out Tongue | Single Tap Teeth | Double Tap Teeth | Swing Tongue Sideways | Curl Towards Back | Left Cheek | Right Cheek | Mouth Floor | Bite Tongue |
|---|---|---|---|---|---|---|---|---|---|---|
| Blink | 84.7% (105) | 1.6% (2) | 2.4% (3) | 0.0% (0) | 0.0% (0) | 3.2% (4) | 2.4% (3) | 0.8% (1) | 4.0% (5) | 0.8% (1) |
| Stick Out Tongue | 0.0% (0) | 89.3% (125) | 0.7% (1) | 1.4% (2) | 5.0% (7) | 0.7% (1) | 0.7% (1) | 0.7% (1) | 1.4% (2) | 0.0% (0) |
| Single Tap Teeth | 0.0% (0) | 2.3% (3) | 84.8% (112) | 1.5% (2) | 2.3% (3) | 0.8% (1) | 1.5% (2) | 0.0% (0) | 6.1% (8) | 0.0% (0) |
| Double Tap Teeth | 0.0% (0) | 0.0% (0) | 0.0% (0) | 80.1% (125) | 1.9% (3) | 1.9% (3) | 1.9% (3) | 1.3% (2) | 7.7% (12) | 5.1% (8) |
| Swing Tongue Sideways | 0.0% (0) | 3.1% (5) | 1.9% (3) | 3.7% (6) | 83.9% (135) | 1.2% (2) | 1.9% (3) | 0.0% (0) | 2.5% (4) | 1.9% (3) |
| Curl Towards Back | 0.0% (0) | 3.6% (5) | 0.7% (1) | 6.4% (9) | 3.6% (5) | 80.0% (112) | 1.4% (2) | 0.7% (1) | 1.4% (2) | 2.1% (3) |
| Left Cheek | 7.9% (12) | 0.7% (1) | 0.0% (0) | 1.3% (2) | 3.9% (6) | 2.0% (3) | 78.3% (119) | 2.6% (4) | 0.7% (1) | 2.6% (4) |
| Right Cheek | 4.2% (6) | 0.7% (1) | 0.7% (1) | 0.7% (1) | 2.1% (3) | 0.7% (1) | 4.2% (6) | 84.5% (120) | 0.7% (1) | 1.4% (2) |
| Mouth Floor | 1.4% (2) | 0.0% (0) | 5.6% (8) | 3.5% (5) | 0.7% (1) | 1.4% (2) | 4.9% (7) | 1.4% (2) | 78.2% (111) | 2.8% (4) |
| Bite Tongue | 2.1% (3) | 0.7% (1) | 5.7% (8) | 0.0% (0) | 2.1% (3) | 2.9% (4) | 5.0% (7) | 1.4% (2) | 1.4% (2) | 78.6% (110) |

FIG. 11

INERTIAL SENSING OF TONGUE GESTURES

BACKGROUND

Gestures can be employed to provide various types of inputs to a computing device. For example, touch gestures can provide a wide range of functionality on touchscreen devices, and techniques such as computer vision can enable users to employ hand gestures to control a computing device. However, touch and hand gestures have certain limitations for applications where the user's hands are occupied or for users with certain physical limitations. While speech recognition and gaze tracking can be employed as alternative hands-free techniques for providing input to a computer, these techniques also have certain limitations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for detecting tongue gestures. One example relates to a method or technique that can include receiving one or more motion signals from an inertial sensor. The method or technique can also include detecting a tongue gesture based at least on one or more motion signals and outputting the tongue gesture.

Another example relates to a method or technique that can include instructing a user to perform a particular tongue gesture and measuring one or more motion signals from an inertial sensor while the user performs the particular tongue gesture. The method or technique can also include training a machine learning model to detect the particular tongue gesture using the one or more motion signals and outputting the trained machine learning model.

Another example includes a system that can include an inertial measurement unit, a processor, and a storage medium. The inertial measurement unit can be configured to provide motion signals. The storage medium can store instructions which, when executed by the processor, cause the system to detect a tongue gesture based at least on the motion signals and control an application based at least on the tongue gesture.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 8A, 8B, and 9-11 illustrate experimental results for detecting tongue gestures using the disclosed techniques.

DETAILED DESCRIPTION

Figure 1:
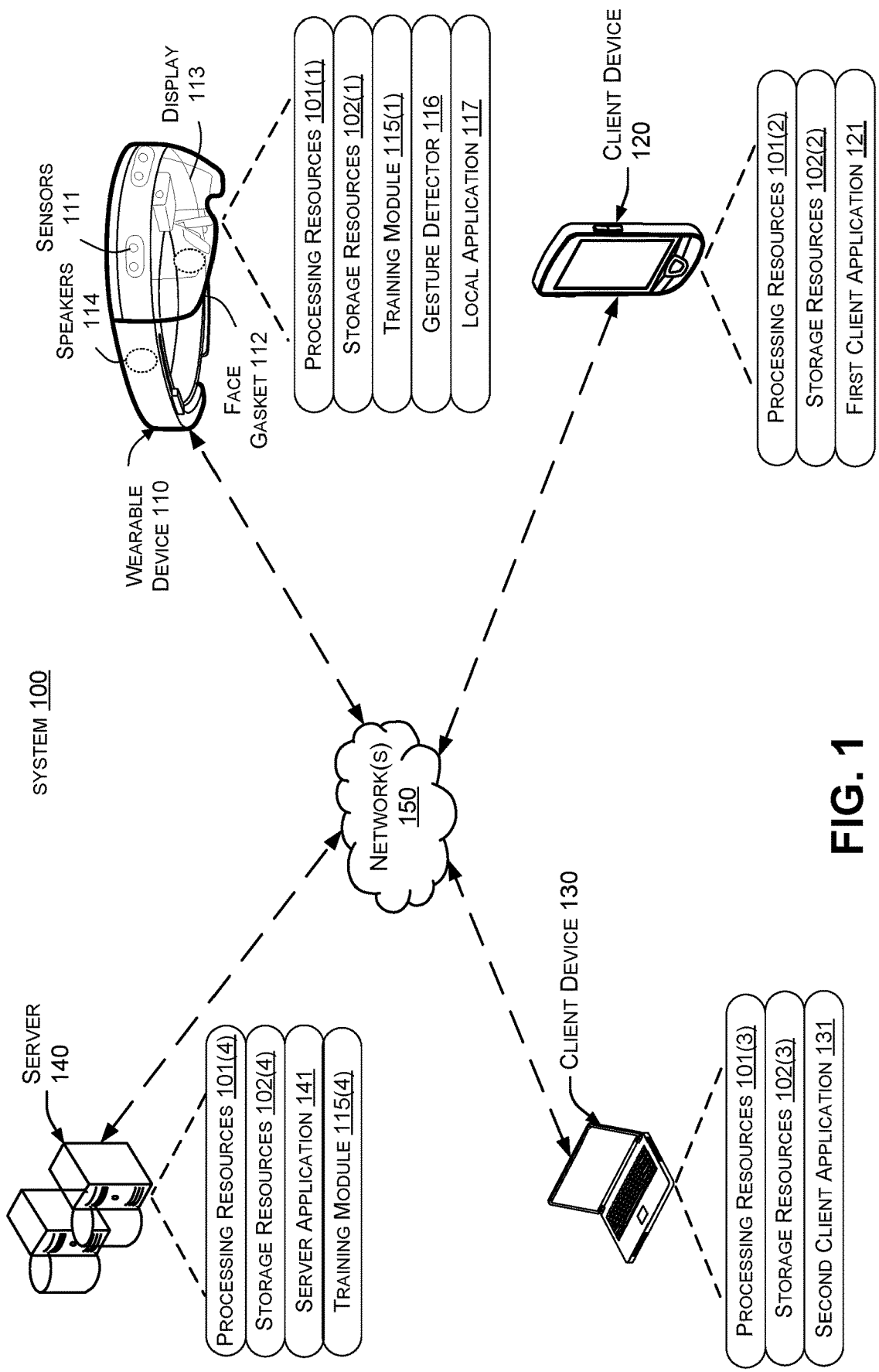
FIG. 1 illustrates an example system, consistent with some implementations of the present concepts.

As noted previously, various techniques such as touch gestures, hand gestures, speech recognition, and gaze tracking have been employed to allow users to provide input to computing devices. One particular type of computing device is a head-worn display, which can be employed for various augmented or virtual reality applications. Gaze tracking and speech recognition are particularly well-suited to use in head-worn displays due to the configuration of various sensors typically found on head-worn displays. However, speech recognition generally has privacy drawbacks and tends to work poorly in noisy environments. Gaze tracking has drawbacks for users with certain motor impairments, and also tends to be relatively slow.

The disclosed implementations relate to sensing of tongue gestures as a means for a user to provide input to a computing device. Tongue gestures have numerous practical advantages for a wide range of application scenarios, because they allow users to provide quiet, hands-free input to a computing device. In addition, certain tongue gestures can be performed with little or no perceptible external movement by the user and can be performed by users with serious physical limitations. However, conventional approaches for detecting tongue gestures have tended to rely on relatively invasive sensors, such as mouth-worn retainers or electromyography sensors.

The disclosed implementations allow for tongue gestures to be detected using sensors such as inertial measurement units ("IMUs") provided in devices such as head-worn displays, earbuds, headphones, cochlear implants, etc. Thus, users can employ tongue gestures to provide input to a computing application using these relatively non-obtrusive sensors. As discussed below, one way to detect a tongue gesture is by using a machine-trained model that learns to classify motion signals into different tongue gestures.

Machine Learning Overview

There are various types of machine learning frameworks that can be trained to perform a given task, such as detecting a gesture. Support vector machines, decision trees, and neural networks are just a few examples of machine learning frameworks that have been used in a wide variety of applications, such as image processing and natural language processing.

A support vector machine is a model that can be employed for classification or regression purposes. A support vector machine maps data items to a feature space, where hyperplanes are employed to separate the data into different regions. Each region can correspond to a different classification. Support vector machines can be trained using supervised learning to distinguish between data items having labels representing different classifications. As discussed below, one way to employ a support vector machine is for binary classification of sensor signals to determine whether the sensor signals represent a gesture or a non-gesture.

A decision tree is a tree-based model that represents decision rules using nodes connected by edges. Decision trees can be employed for classification or regression and can be trained using supervised learning techniques. For certain applications, using a single decision tree does not provide sufficient accuracy. However, multiple decision trees can be employed in a random forest to significantly improve the accuracy of the resulting model. In a random forest, the collective output of the individual decision trees is employed to determine a final output of the random forest. For instance, in regression problems, the output of each individual decision tree can be averaged to obtain a final result. For classification problems, a majority vote technique can be employed, where the classification selected by the random forest is the classification selected by the most decision trees. As discussed below, one way to employ a decision tree or random forest is to classify motion signals and/or other sensor signals into specific gesture classes.

A neural network is another type of machine learning model that can be employed for classification or regression tasks. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Neural networks can also be employed for binary classification of motion signals or other signals as gestures vs. non-gestures, and/or to classify motion signals and/or other sensor signals into specific gesture classes.

Various training procedures can be applied to learn the edge weights and/or bias values of a neural network. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned, e.g., individualized tuning to one or more particular users. Note that two trained models can share the same model structure and yet have different values for the internal parameters, e.g., if the two models are trained on different training data or if there are underlying stochastic processes in the training process.

Definitions

For the purposes of this document, the term "gesture" refers to a movement of a human body part that can be interpreted as a command to control a computer. For instance, a particular gesture can be mapped to a particular command, such as enter, select, backspace, etc. A "tongue gesture" is a gesture that is performed by a human user using at least their tongue, potentially along with other body parts.

A "signal" is a function that varies over time or space. A "motion signal" is a signal that conveys motion, e.g., of a human body part such as a tongue. A motion signal is one example of a sensor signal, which is any signal produced by a sensor by detecting conditions of an environment and outputting data that characterizes those conditions.

An "application" is a computing program, e.g., that responds to commands from a user. An application can be a virtual reality application that immerses the user entirely or almost entirely in a virtual environment. An application can also be an augmented reality application that presents virtual content in a real-world setting. Other examples of applications include productivity applications (e.g., word processing, spreadsheets), video games, digital assistants, teleconferencing applications, email clients, web browsers, operating systems, Internet of Things (IoT) applications, etc.

The term "model" is used generally herein to refer to a range of processing techniques, and includes models trained using machine learning as well as hand-coded (e.g., heuristic-based) models. For instance, as noted above, a machine-learning model could be a neural network, a support vector machine, a decision tree, a random forest, etc. Models can be employed for various purposes as described below, such as gesture classification.

Example System

The present implementations can be performed in various scenarios on various devices. FIG. 1 shows an example system 100 in which the present implementations can be employed, as discussed below.

As shown in FIG. 1, system 100 includes a wearable device 110, a client device 120, a client device 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the server, can be implemented in data centers, server farms, etc.

Certain components of the devices shown in FIG. 1 may be referred to herein by parenthetical reference numbers. For the purposes of the following description, the parenthetical (1) indicates an occurrence of a given component on wearable device 110, (2) indicates an occurrence of a given component on client device 120, (3) indicates an occurrence on client device 130, and (4) indicates an occurrence on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Wearable device 110 can include from one or more sensors 111, which provide information about the location and/or movement of a user of the device (e.g., the user's head, eyes, tongue, etc.). The sensors can be internal and/or external. One specific type of sensor is an inertial measurement unit ("IMU") configured to provide acceleration, gyroscopic, and/or magnetic measurements. In some cases, an IMU can be provided in a face gasket 112 of the wearable device, which can surround display 113. In other cases, the IMU can be provided in smart headphones, earbuds, a cochlear implant, or in any other location where tongue movements can be detected. Other types of sensors can include photoplethysmography (PPG) sensors, electroencephalogram (EEG) sensors, position tracking sensors, eye tracking sensors, etc. Note that some sensors may be provided separately and are not necessarily components of the wearable device. For instance, external sensors can communicate sensor data to the wearable device using wired or wireless (e.g., Bluetooth) communication links.

Visual content can be presented on the display 113 of the wearable device 110, and sound can be output using one or more speakers 114. The wearable device can also include a training module 115(1), a gesture detector 116, and a local application 117. The training module can be configured to instruct a user via the display and/or speakers to perform a particular tongue gesture, record motion signals from the IMU as well as other sensor signals while the particular tongue gesture is performed, and train a machine learning model to detect tongue gestures using the particular tongue gesture as a label for the recorded signals.

The gesture detector 116 can be configured to detect tongue gestures based on the signals and output the detected tongue gestures to the local application. For instance, the gesture detector can input motion signals into the trained machine learning model and receive an output from the trained machine learning model identifying a predicted tongue gesture. The gesture detector can output the tongue gesture to a local application 117. For instance, the tongue gesture can select a particular item that the user has targeted using another input mechanism, such as a mouse, eye gaze, etc.

In some cases, the wearable device can interact with remote applications as well. For instance, the user may use tongue gestures to provide input to a first client application 121 on client device 120 and to a second client application 131 on client device 130 using tongue gestures. For instance, the user can control their personal devices such as phones, tablets, laptops, etc., over a local wireless connection. The user may use tongue gestures to provide input to server application 141, e.g., over a wide-area network. In some cases, the server can include a training module 115(4) that can perform some or all of the training remotely from the wearable device. Although not illustrated in FIG. 1, training can also be performed elsewhere in the system, e.g., on client devices 120 and/or 130. In cases where training is performed remotely, the trained machine learning model can be communicated over network(s) 150 to the wearable device, which can then execute the trained machine learning model locally.

Side Views of Example Tongue Gestures

Figure 2A:
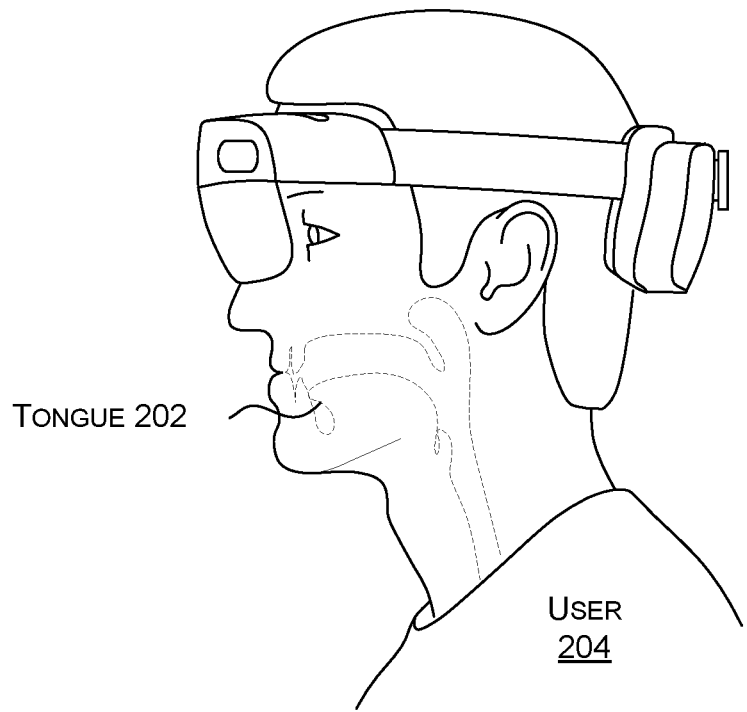
FIGS. 2A-2E illustrate side views of example tongue gestures, consistent with some implementations of the present concepts.
Figure 2B:
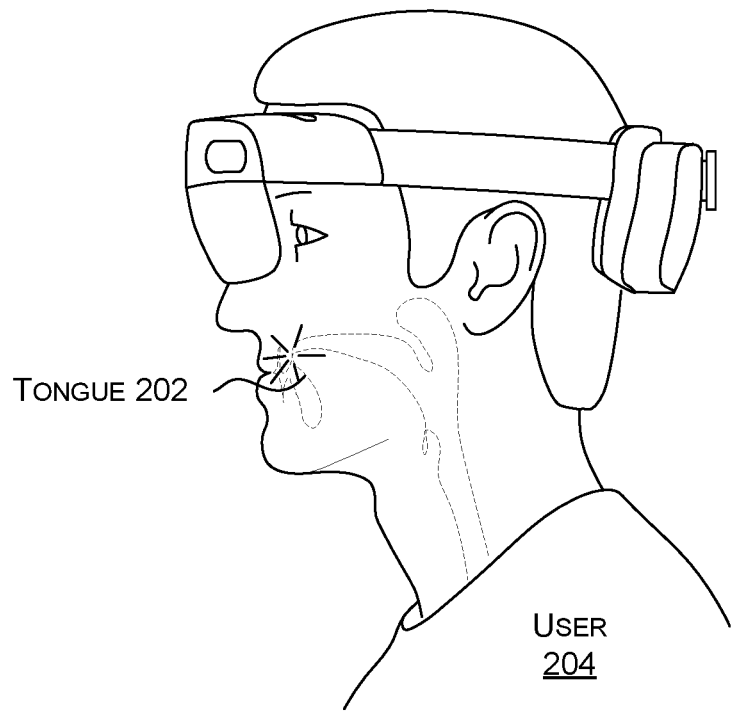
Figure 2C:
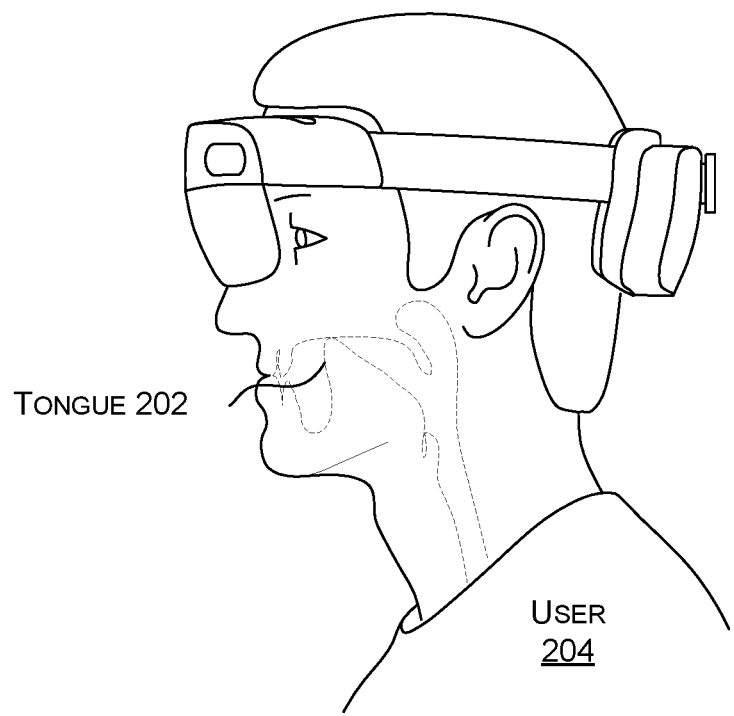
Figure 2D:
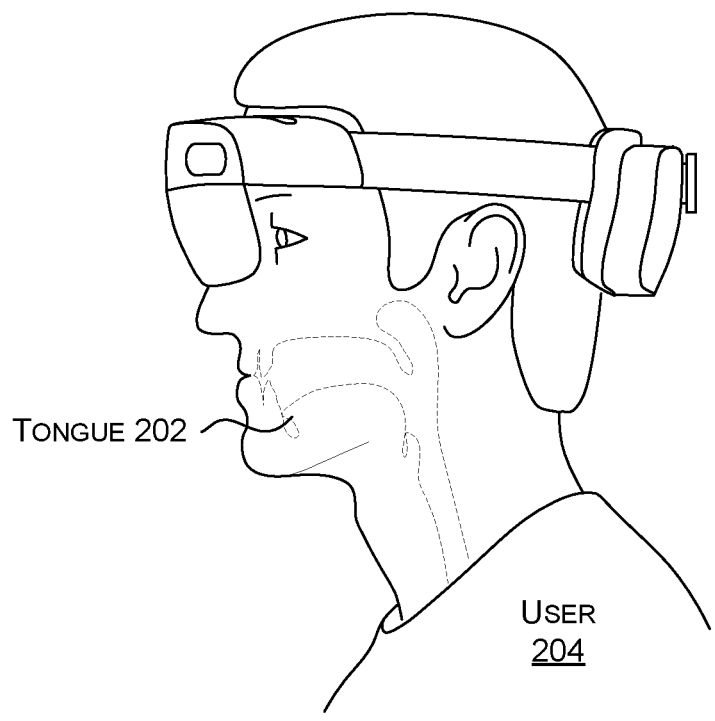
Figure 2E:
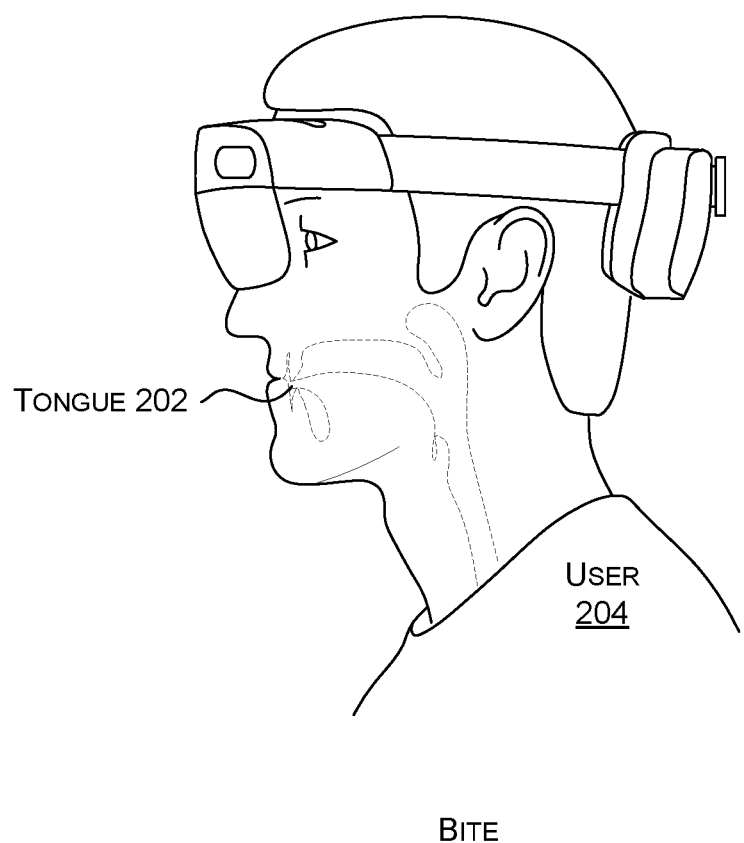

FIG. 2A illustrates an example resting state of a tongue 202 of a user 204. FIGS. 2B-2E show movements of the tongue relative to the resting state to perform certain gestures. FIG. 2B illustrates an upper teeth tap gesture where the tongue moves upward to tap one or more front upper teeth. FIG. 2C illustrates a curl back gesture where the tongue moves upward and backward. FIG. 2D illustrates a mouth floor gesture where the tongue moves downward to contact the floor of the user's mouth. FIG. 2E illustrates a bite gesture where the user bites their tongue.

Frontal Views of Example Tongue Gestures

Figure 3A:
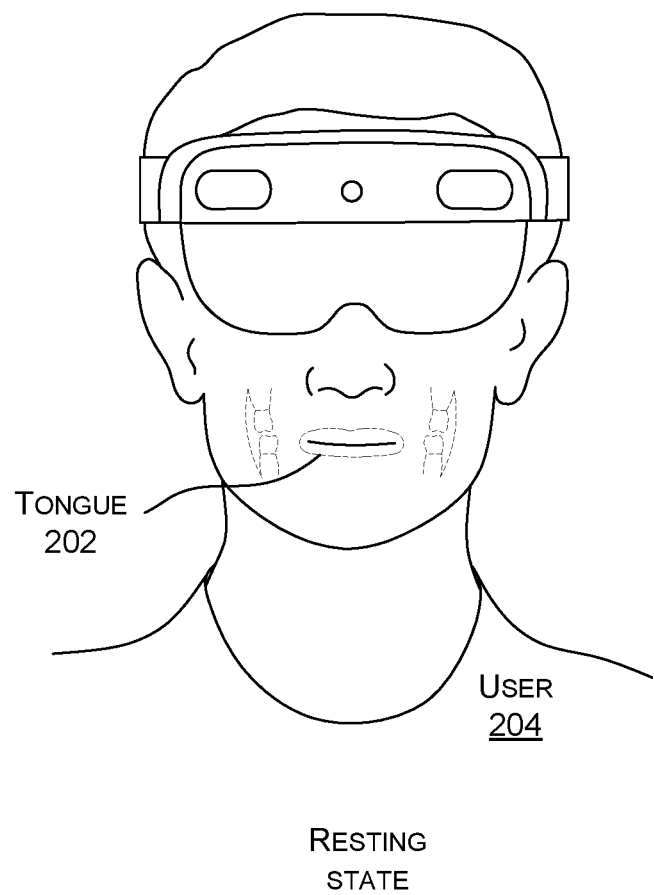
FIGS. 3A-3D illustrate frontal views of example tongue gestures, consistent with some implementations of the present concepts.
Figure 3B:
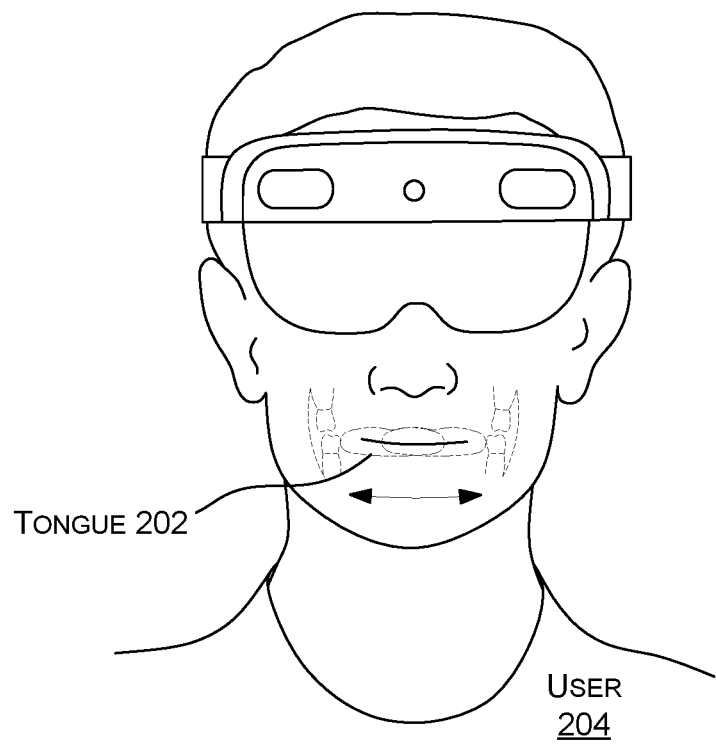
Figure 3C:
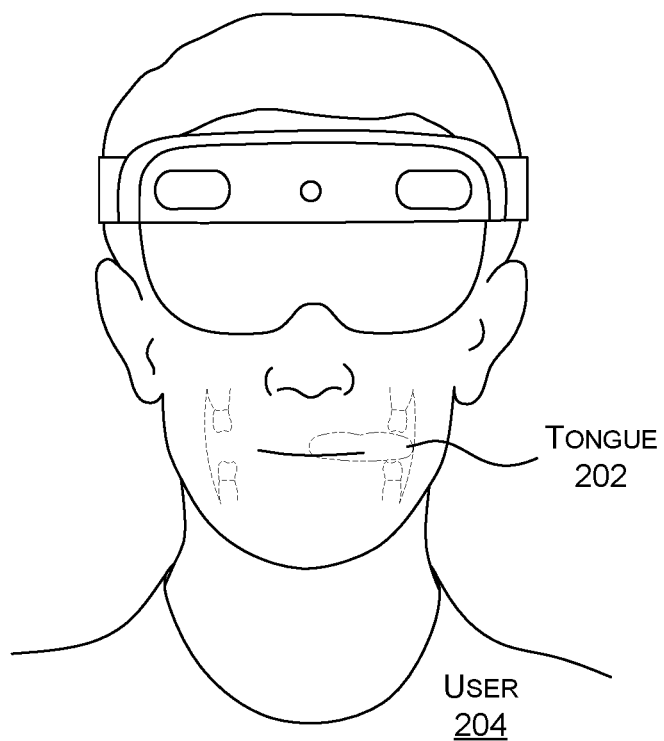
Figure 3D:
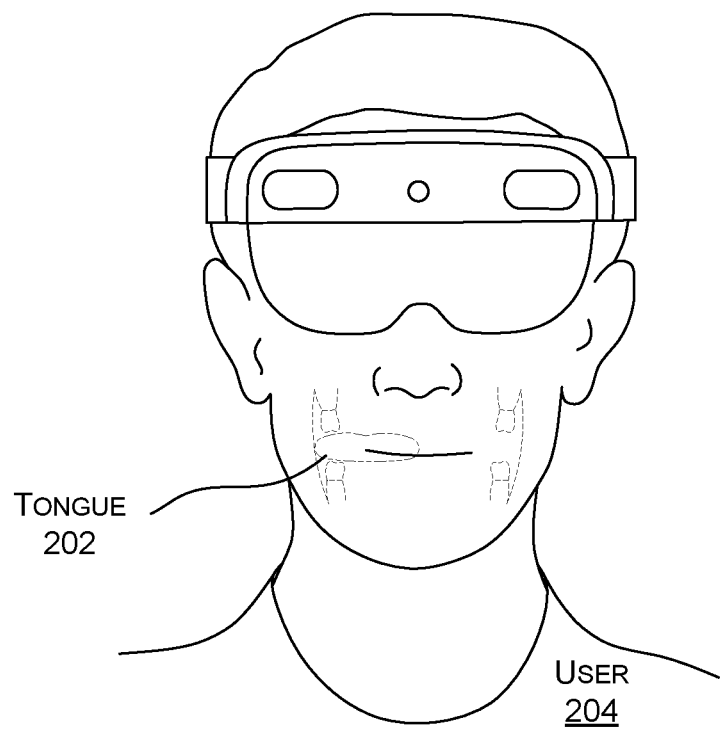

FIG. 3A illustrates an example resting state. FIGS. 3B-3D show movements of the tongue relative to the resting state to perform certain gestures. FIG. 3B illustrates a swing tongue sideways gesture where tongue 202 is moved laterally left and right. FIG. 3C illustrates a left cheek gesture where the tongue moves laterally to the left to contact the left cheek of the user 204. FIG. 3D illustrates a right cheek gesture where the tongue moves laterally to the right to contact the right cheek of the user 204.

Example Application Scenario

Figure 4:
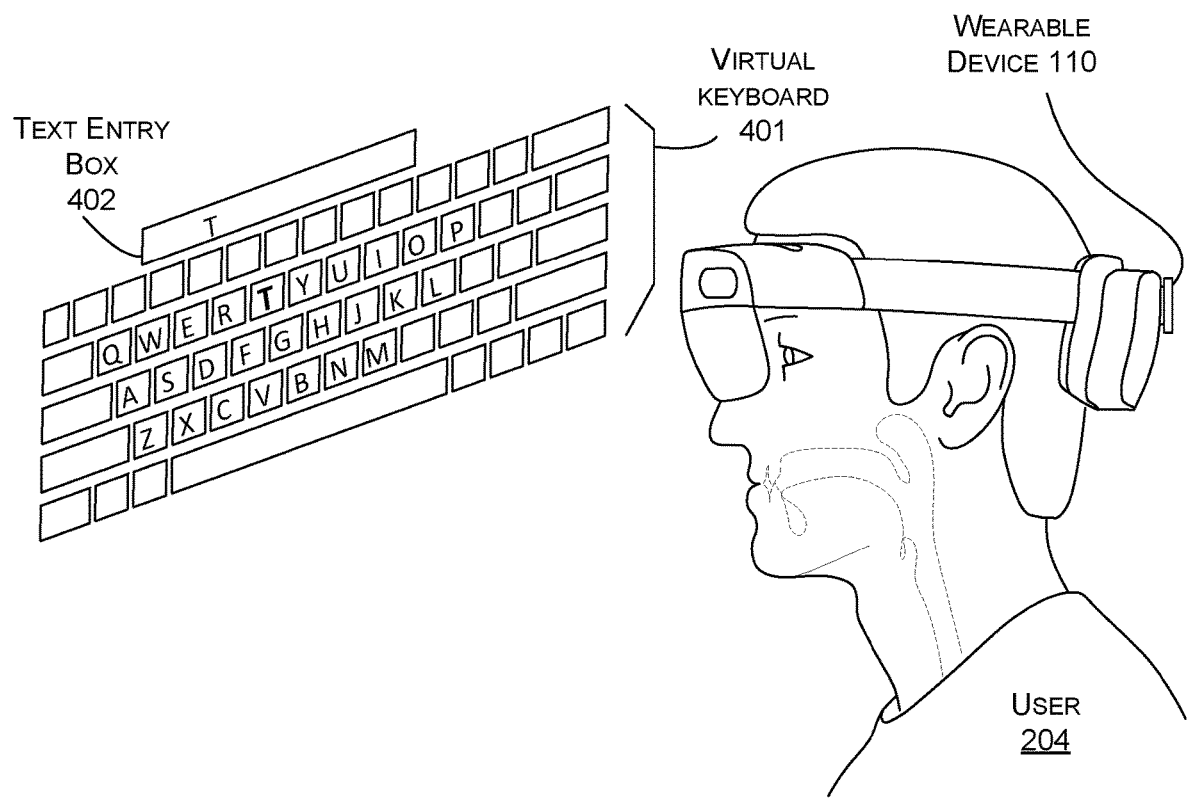
FIG. 4 illustrates an example tongue gesture application scenario, consistent with some implementations of the disclosed techniques.

FIG. 4 illustrates an example application scenario 400 that conveys how various sensing modalities can be combined to allow users to control an application. Here, user 204 is shown a virtual keyboard 401 to enter text into a text entry box 402. The user can scan with their eyes over individual letters of the virtual keyboard. As the user scans, gaze tracking using one or more sensors can be employed to determine which letter the user's gaze is directed, and that letter can be visually distinguished (e.g., bolded, enlarged, etc.) to inform the user which letter they have currently targeted. When the user reaches the letter they wish to enter, they can perform a specific tongue gesture (e.g., a single upper teeth tap) to enter that letter. Another gesture (e.g., a left cheek tap) could be employed to backspace over the letter that has been entered.

Note that FIG. 4 is but one of many example application scenarios that can be employed. For instance, other gestures can also be involved, e.g., a head shake can be used instead of a left cheek tap for a backspace. Other targeting mechanisms such as a mouse or trackpad can be employed instead of using eye gaze. In addition, text entry is but one of many types of applications that can receive input from tongue gestures. For instance, video games, flight simulators, mapping applications, messaging applications, and emergency calls can be controlled in whole or in part using tongue gestures as described herein.

In addition, note that tongue gestures can also be employed for audio-only applications. Consider a user listening to music on earbuds. A user could use one tongue gesture (e.g., a single tap) to pause, another tongue gesture (e.g., a double-tap) to go to the next track, etc. As another example, a tongue gesture could be used to interact with a virtual assistant, such as Cortana, Siri, Alexa, etc.

Example Gesture Detection Method

Figure 5:
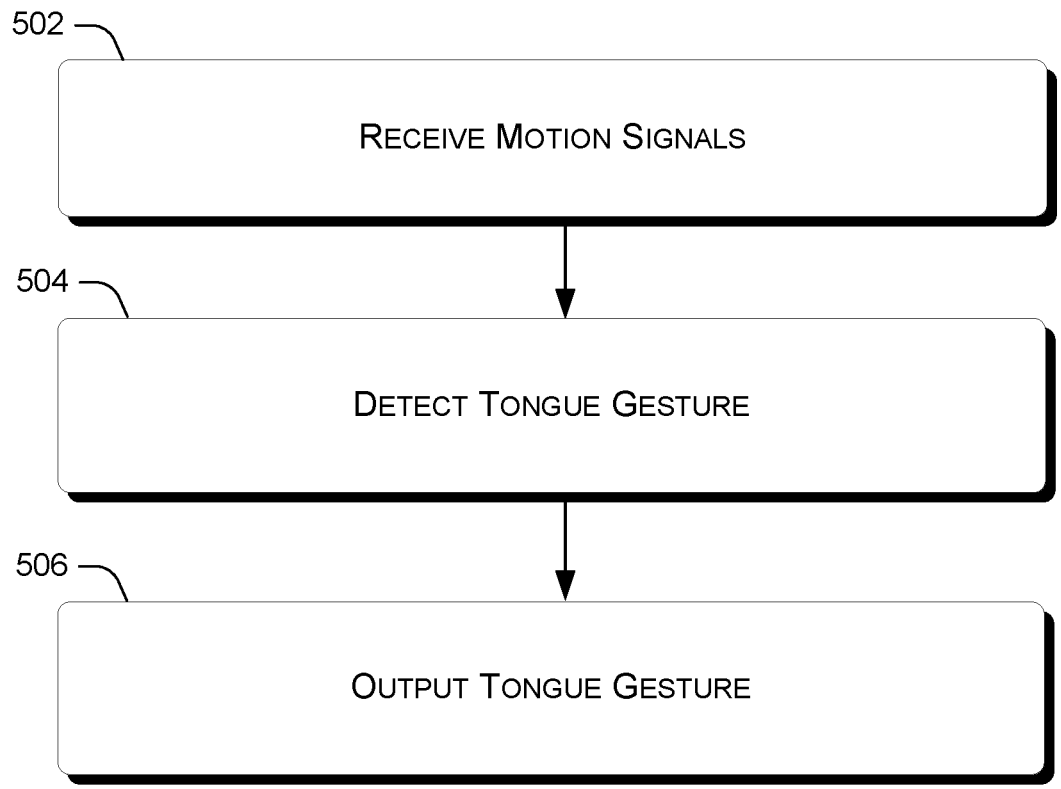
FIG. 5 illustrates an example method or technique for detecting a tongue gesture, consistent with some implementations of the disclosed techniques.

FIG. 5 illustrates an example method 500, consistent with some implementations of the present concepts. Method 500 can be implemented on many different types of devices, e.g., by one or more wearable devices, by one or more cloud servers, by one or more client devices such as laptops, tablets, or smartphones, or by combinations of one or more wearable devices, servers, client devices, etc.

Method 500 begins at block 502, where one or more motion signals are received from an inertial sensor. For instance, the inertial sensor can include an accelerometer that provides acceleration signals, and/or gyroscope that provides rotation signals, and/or a magnetometer or compass that provides absolute direction signals. In some cases, signals from other sensors can also be obtained at block 502, e.g., PPG signals, EEG signals, position tracking signals, eye tracking signals, etc.

Method 500 continues at block 504, where a tongue gesture is detected using the one or more motion signals, optionally with signals from other sensors. For instance, one or more motion signals can be input to a trained machine learning model, such as a decision tree, random forest, or neural network, for classification. The detected tongue gesture can correspond to the classification predicted by the trained machine learning model.

Method 500 continues at block 506, where the tongue gesture is output. For instance, the tongue gesture can be mapped to a specific application command (e.g., select, scan, undo, deselect, etc.) and the application command can be provided to a local or remote application.

In some cases, method 500 can be performed partly or entirely by gesture detector 116 locally on wearable device 110. In other cases, part or all of the gesture detection is performed by a different computing device. For instance, any of client device 120, client device 130, and/or server 140 can receive motion sensor signals and/or other signals and perform gesture detection thereon.

Example Training Method

Figure 6:
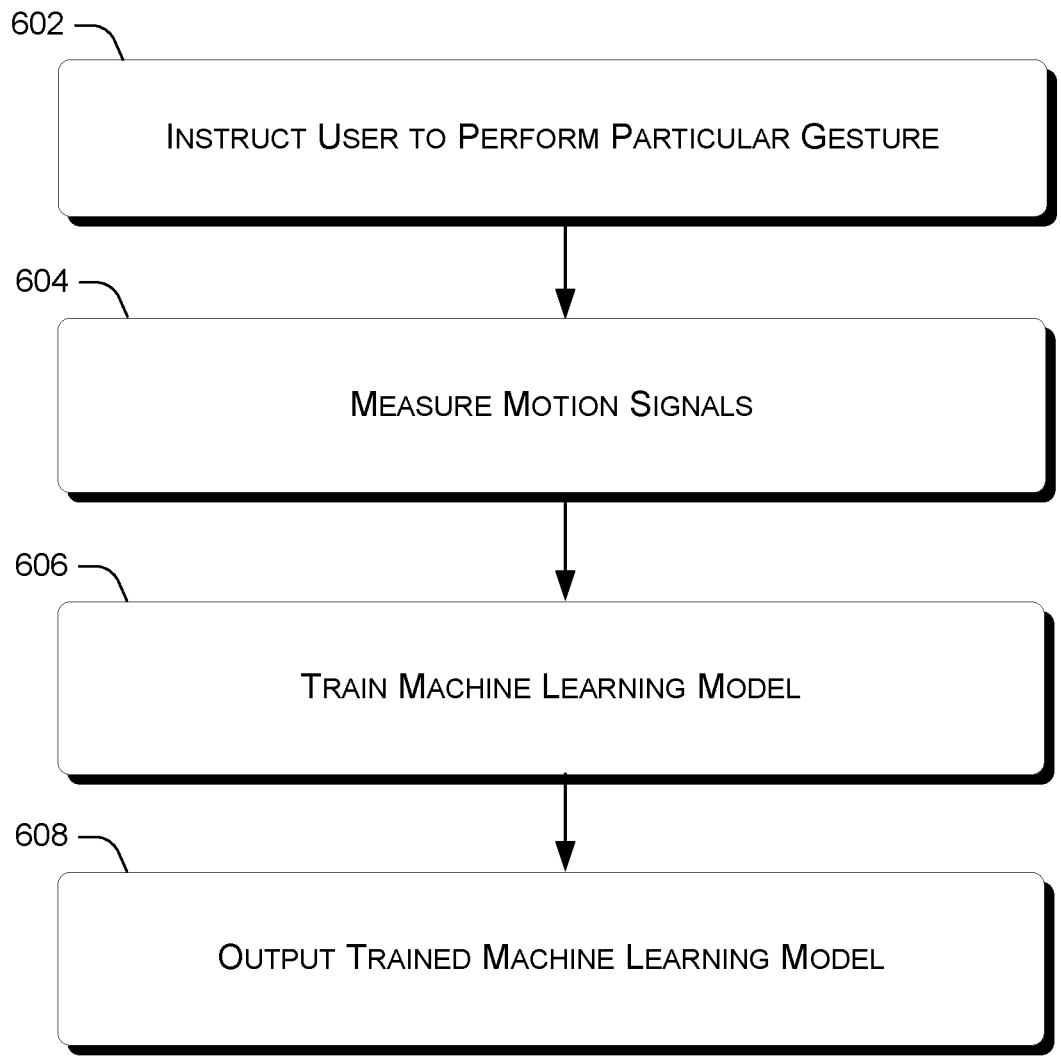
FIG. 6 illustrates an example method or technique for training a model to detect a tongue gesture, consistent with some implementations of the disclosed techniques.

FIG. 6 illustrates an example method 600, consistent with some implementations of the present concepts. Method 600 can be implemented on many different types of devices, e.g., by one or more wearable devices, by one or more cloud servers, by one or more client devices such as laptops, tablets, or smartphones, or by combinations of one or more wearable devices, servers, client devices, etc.

Method 600 begins at block 602, where a user is instructed to perform a particular tongue gesture. For instance, a display and/or speaker can be used to instruct a user to perform any of the tongue gestures shown above in FIGS. 2B-2E and 3B-3E.

Method 600 continues at block 604, where one or more motion signals from an inertial sensor are measured while the particular tongue gesture is performed. As noted previously, the inertial sensor can include an accelerometer that provides accelerometer signals, a gyroscope that provides gyroscopic signals, and/or a magnetometer or compass that provides magnetic motion signals. In some cases, signals from other sensors can also be obtained at block 604, e.g., PPG signals, EEG signals, position tracking signals, eye tracking signals, etc.

Method 600 continues at block 606, where a machine learning model is trained to detect the particular tongue gesture using the one or more motion signals. For instance, the particular tongue gesture can be used as a label for supervised learning based on the measured motion signals. The machine learning model can include one or more classifiers. An example of a hierarchical machine learning model with multiple classifiers is described below. Parameters of the machine learning model can be updated based on whether a prediction of the machine learning model matches the label.

Method 600 continues at block 608, where the trained machine learning model is output. For instance, the trained machine learning model can be output for use by a local gesture recognition module or sent to another machine for use by a remote gesture recognition module.

In some cases, method 600 can be performed partly or entirely by training module 115. Note that some implementations can involve blocks 602 and 604 being performed by a local training module on wearable device 110, with blocks 606 and/or 608 being performed by a remote training module on server 140. In such implementations, the server can send the trained model back to the wearable device for use by gesture detector 116.

Experimental Study

The following describes various experiments that were conducted and results obtained via the experiments. The experiments were conducted using two commercially-available devices, the HP Reverb G2 Omnicept Edition VR headset and the Muse 2 EEG headband. Both devices can be worn concurrently by a user by placing the Muse 2's forehead sensors slightly above the top of the Reverb G2's face gasket. Data from both devices was synchronized for subsequent processing. The following table describes sensor capabilities of each device:

| Device | Modality | Location | Frequency | Details |
| --- | --- | --- | --- | --- |
| Muse 2 | IMU | Behind left ear | 52 Hz | 6-axis, 3 from accelercometer and 3 from gyroscope |
| | EEG | 2 across forehead, 2 behind ears | 256 Hz | 5-axis: 2 temporal, 2 frontal electrodes and 1 amplified auxiliary channel |
| | PPG | Forehead | 64 Hz | 3-axis, 2 IR and 1 red LED |
| HP Reverb G2 Omnicept Edition | IMU | Forehead, middle of face gasket | 998 Hz | 6-axis, 3 from accelerometer and 3 from gyroscope. HP reports 512 Hz instead of 998 Hz |
| | PPG | Forehead, middle of face gasket | 0.2 Hz | No direct access, reported as Heart Rate and Heart Rate Variability |
| | Eye Tracking | Between eyes in VR headset | 120 Hz | 21-axis gaze tracking and pupillometry for both eyes |
| | Head Tracking | Calculated from cameras around headset | 54 Hz | 19-axis linear and angular position/velocity/acceleration accessed through OpenXR |
| | Mouth Camera | In front of nose, bottom of headset | 90 Hz | 400 x 400 grayscale pixels from IR camera, not in dataset |

| Device | Modality | Location | Frequency | Details |
|---|---|---|---|---|
| | Cognitive Load | Calculated from eye tracking and PPG | 1 Hz | 1 minute after start, cognitive load and confidence [2] |

During data collection, the user can press the "A" button on a Windows Mixed Reality controller to start a gesture and release it to stop the gesture, continuing to the next gesture. As gestures often take variable duration to complete, this allows more accurate boundaries to the gesture while also measuring the duration. If the user believes they made a mistake, they can instead press the "B" button to delete and redo the previous gesture.

Gesture Design

The gestures disclosed herein were selected so that they could be done with the mouth closed, so that there were neither auditory nor visual cues to a third-party observer. The gestures were selected to be usable while also able to be recognized and distinguished with limited sensing capabilities. All the gestures are silent, contained within the mouth and use the teeth, cheeks, and palate for haptic feedback.

In addition to the eight tongue gestures described above, two control gestures, "Blink" and "Stick Out Tongue," were selected to benchmark performance. The "Blink" serves as a point of comparison that can be employed to verify signal quality and timestamping because of the large EEG signals and eye tracking measurements generated by the gesture. Meanwhile, the "Stick Out Tongue" gesture is an open-mouth gesture to make usage obvious because the eight closed-mouth gestures were sometimes too discreet to be noticed by the experimenters.

Sixteen adult participants performed the study fully in virtual reality using the visual display in the Reverb G2. At the beginning of the trial, participants were prompted as to which gesture they were to perform. During the trial, participants performed that gesture repeatedly, marking the start and end point of each gesture using the "A" button on the Windows Mixed Reality controller (i.e., button-down, button-up). Participants repeated the gesture 50 times in each trial while a visual-counter was incremented with each button press. Once they reached 50 gestures performed, the trial would end. In between batches, participants received a 10 second mandatory rest period to recoup attention. This created a total of 3000 training examples per participant.

Hierarchical Model

Figure 7:
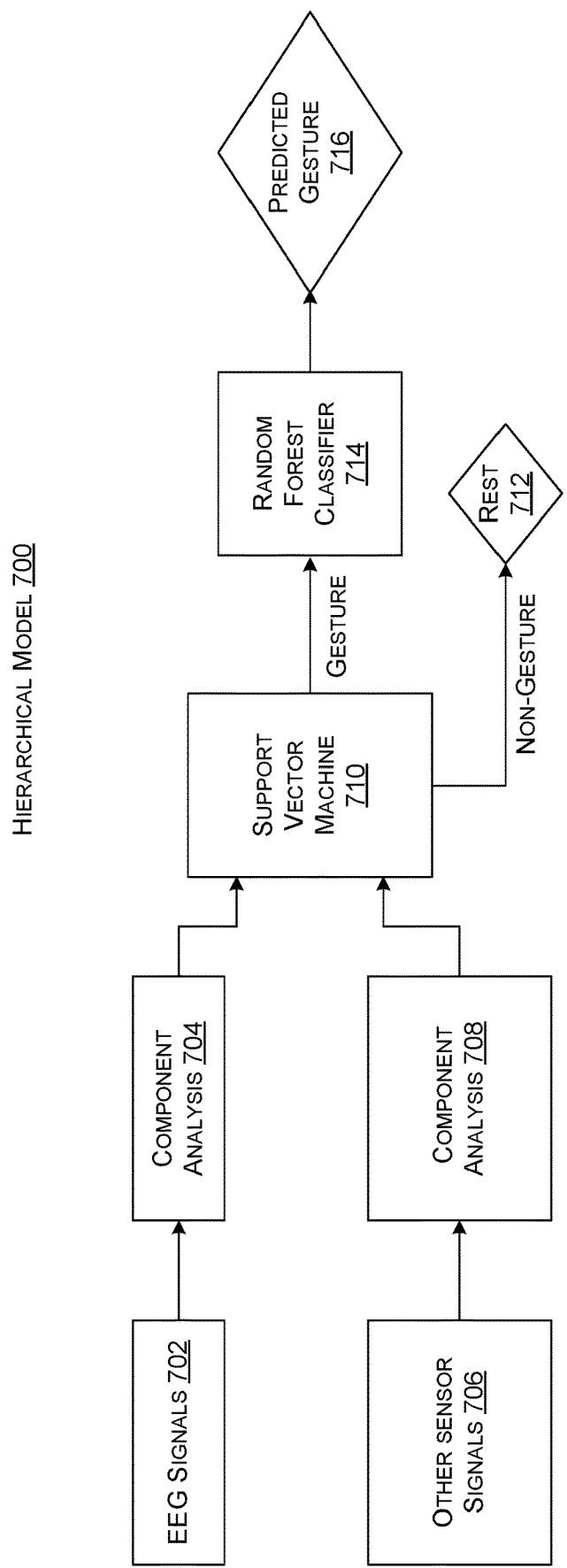
FIG. 7 illustrates an example hierarchical model for tongue gesture recognition, consistent with some implementations of the disclosed techniques.

For gesture recognition, a hierarchical model 700 as shown in FIG. 7 was employed. EEG signals 702 are processed using component analysis 704, which can include processing the signals with a finite impulse response (FIR) filter as well as performing Independent Component Analysis (ICA) on the filtered EEG signals. Other sensor signals 706 can include IMU signals, PPG signals, position tracking signals, and/or eye tracking signals, which can be processed using component analysis 708. For instance, component analysis 708 can involve performing Principal Component Analysis (PCA) separately on data from each of the other sensors to extract principal components of the sensor data.

Then, a Support Vector Machine (SVM) 710 can be employed to perform binary classification using a moving time window of data output by component analysis 704 and component analysis 708. The SVM can output either a value indicating that the moving window contains a gesture or a non-gesture. If the moving window is classified by the SVM as containing a non-gesture, then the hierarchical model 700 proceeds to rest 712 until the next moving window is input. If the moving window is classified by the SVM as containing a gesture, the gesture can be classified by random forest classifier 714 to obtain predicted gesture 716. Note that hierarchical model 700 is but one example of a model that can be employed for gesture recognition, as discussed more below.

Both the SVM 710 and the random forest classifier 714 can be trained using labeled training data provided by one or more users. For instance, training examples of signals from gestures and non-gestures can be obtained and employed to train the SVM. Parameters of the SVM can be updated based on whether a prediction of gesture vs. non-gesture for a given training example matches a corresponding label for that training example. Similarly, examples of signals of each type of gesture can be obtained and employed to train the random forest classifier. Parameters of the SVM can be updated based on whether a prediction of a particular gesture class for a given training example matches a corresponding label for that training example.

Experimental Results

Figure 8B:
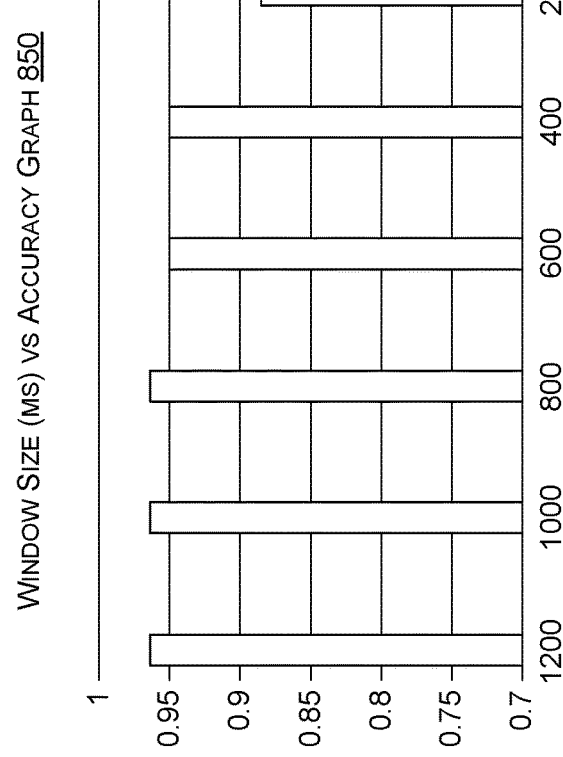
Figure 8A:
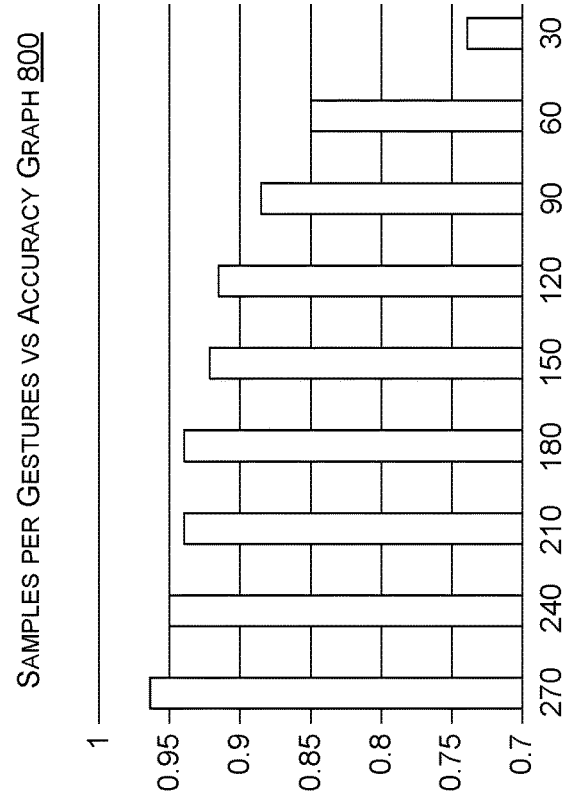

FIG. 8A shows samples per gesture vs. accuracy graph 800, which convey how accurately hierarchical model 700 was able to classify tongue gestures. Graph 800 shows that accuracy increases sharply up to about 60 samples used to train the model, at which point the rate at which accuracy improves begins to decay. FIG. 8B shows a window size vs. accuracy graph 850, which shows that accuracy was fairly consistent for windows of 400 milliseconds and above but decreased below that. Note that shorter windows generally allow for faster hands-free interactions.

Figure 9:
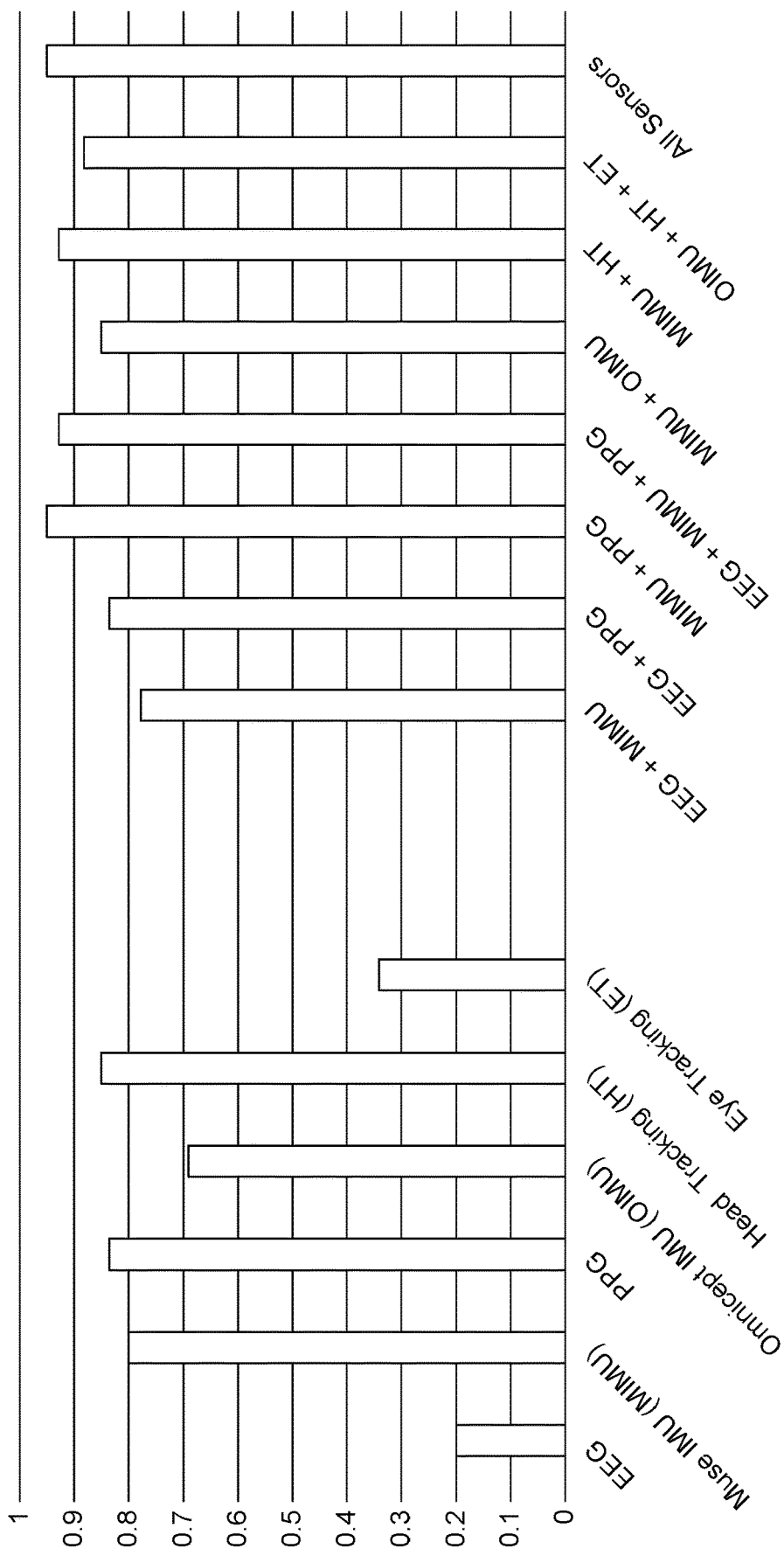

FIG. 9 shows accuracy by sensing modality graph 900. The recognition accuracy of certain sensors was tested individually, showing that the PPG and head tracking could achieve more than 80% accuracy alone. The Muse IMU at the back of the ear was also capable of similar performance. The most effective combinations turned out to be using the Muse IMU with PPG or simply combining all of the six sensors used in recognition.

FIG. 10 shows a user-dependent confusion matrix 1000 and FIG. 11 shows a user-independent confusion matrix 1100. The user-dependent confusion matrix conveys the accuracy of gesture detection experiments conducted using a user-dependent recognition model trained for a particular user that performed the gestures. The user-independent confusion matrix conveys the accuracy of gesture detection experiments conducted using a user-independent recognition model trained using data from multiple other users, but not necessarily the user that performed the gesture during the experiment.

The control gestures for this experiment were included to provide a baseline of how the model performed on such standardized gestures. As shown in user-dependent confusion matrix 1000, 94% accuracy was achieved but the "Swing Tongue Sideways" gesture underperformed with 82% accuracy. For user-independent classification, 81% accuracy was achieved.

Alternative Implementations

While a hierarchical model with a random forest classifier is described above for gesture classification, note that various other types of models can also be employed such as Support Vector Machines, Random Forest Classifiers, Multi-Layer Perceptrons and Logistic Regression for the classifier. Meanwhile, for dimensionality reduction, PCA and ICA approaches are mentioned above, but note that other approaches such as Linear Discriminant Analysis (LDA) can also be employed.

The IMU and PPG were particularly useful for tongue gesture classification in the experiments described above. However, there are still many other sensors that could be used in head-worn displays to detect tongue gestures. Acoustic approaches have been effective in sensing mouth movements in earables, and can also be employed for head-worn displays. As another example, the motion at the back of the ear captured by the Muse 2 IMU could also potentially be detected in other modalities such as stretch sensors.

Note that the IMU behind the ear is a low-cost method of detecting tongue gestures, with a position allowing it to be combined with other mouth-sensing approaches such as an ear EMG sensor or an in-ear acoustic sensor. As a result, an IMU or a combination of these approaches can be used in wearables or smart headphones, and head-worn devices can be provided with relatively few modifications to existing hardware. Other approaches could involve using multiple IMU's and/or combining an ear IMU with virtual reality position tracking. Discreet, hands-free tongue gestures could replace touch-based gestures on these devices or be an alternative configuration for them.

The disclosed techniques can also be employed for a wide range of applications. For instance, the disclosed implementations are particularly suited for hands-free control of computing devices. Consider, for instance, a user riding a motorcycle and wearing a helmet with an IMU and/or one or more other sensors. The user could use tongue gestures to control a digital speedometer on the motorcycle to switch from metric to Imperial units and back without removing their hands from the handlebars. As another example, the user could control a navigation application on a mobile phone or integrated into a display on the motorcycle without removing their hands from the handlebars.

As another example, consider a fighter pilot wearing a helmet with an IMU or other sensor. The pilot could control the fighter jet with their hands on the throttle and joystick while using tongue gestures to control weapons systems, navigational systems, countermeasures such as chaff and flare, etc. The helmet could provide a heads-up display that allows the pilot to use gaze to select individual graphical elements for selection using a tongue gesture.

As another example, consider a deaf person wearing a cochlear implant. In the event of an emergency such as a car crash, the user could employ tongue gestures to invoke an emergency signal to call for help. Thus, even if the user had difficulty using voice communication to call for help, the user could still access emergency services.

The disclosed implementations are also particularly suited for use cases where quiet, undetectable gestures are desirable. Consider a user in a concert hall that wishes to acknowledge a text message received from a friend, without touching their mobile phone and without making any noise. A tongue gesture could be employed by such a user to respond to their friend without disrupting the concert by pulling out their mobile phone or making any noise.

As another example, consider a biologist that wishes to avoid detection by a particularly shy species of animal. For instance, a biologist studying such an animal could be able to sit still for long periods of time while in the presence of such an animal while still messages using a tongue gesture without any facial movement or noise. Thus, the biologist could observe animals in their native habitat without inadvertently affecting their behavior.

In addition, other types of data could be employed to improve the accuracy of tongue gesture recognition. For instance, context data such as location, time, user profiles, or other information could be employed. For instance, consider a user that tends to subconsciously move their tongue when exercising. For this user, a higher classification threshold could be employed when the user is at the gym than when in other locations, to avoid false positive gesture detection when the user is inadvertently moving their tongue when exercising at the gym. As another example, if a user is at or nearby a restaurant, a higher classification threshold could also be employed, to avoid false positive gesture detection when a user happens to move their tongue shortly after eating without intending to invoke a specific gesture. In other cases, users can be allowed to manually turn off gesture detection for a period of time, or automated techniques can be employed to turn on/off gesture detection (e.g., when the user is speaking).

Technical Effect

The disclosed techniques provide for a tongue gesture interface that does not necessarily involve any additional sensors beyond those available in commercial head-worn displays. The IMUs, PPGs and motion tracking capabilities in head-worn displays can provide relatively accurate tongue gesture classification for a range of different tongue gestures. Moreover, various combinations of sensors are provided that may enable tongue gesture interactions in head-worn displays with relatively low cost and involving relatively few hardware modifications.

In addition, using the disclosed techniques, tongue gestures can be executed and recognized at 400 ms, less than gaze and dwell rates for most users. As a consequence, users perceive relatively low latency and the application being controlled is highly responsive to the user's inputs. This can be helpful for various reasons. For instance, in a word processing context, the tongue gesture interface can allow a user to be highly productive, e.g., to produce work product relatively quickly as compared to alternative gesture techniques. As another example, in a video game context, the user can have a high-quality gaming experience because the game responds relatively quickly to a given tongue gesture. In a music context, the user can control a musical instrument to produce sounds rhythmically at a rate that is enjoyable for the user.

Further, the disclosed techniques provide for gaze & tongue interaction as a hybrid method for hands-free interaction, in particular for use with head-worn displays. By combining gaze-based targeting of individual graphical elements such as virtual keyboard keys with tongue-based selection of a targeted graphical element, the disclosed techniques allow for user experiences comparable to those that involve conventional input devices such as mice, keyboards, and/or touch screens.

In addition, as noted previously, tongue gestures are quiet, preserve privacy, and can be performed by users with physical limitations that render other input techniques difficult or impossible. As a consequence, tongue gestures are practical for a wide range of application scenarios. Furthermore, the human tongue is a dextrous organ capable of a wide range of motions, and thus can be employed for a variety of different gestures that can be readily discerned using commercially-available hardware.

Device Implementations

As noted above with respect to FIG. 1, system 100 includes several devices, including a wearable device 110, a client device 120, a client device 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a method comprising receiving one or more motion signals from an inertial sensor, detecting a tongue gesture based at least on the one or more motion signals, and outputting the tongue gesture.

Another example can include any of the above and/or below examples where the tongue gesture comprises one or more taps on one or more front upper teeth by a tongue of a user.

Another example can include any of the above and/or below examples where the tongue gesture comprises lateral movement of a tongue of a user, the lateral movement including a tap of a left or right cheek of the user.

Another example can include any of the above and/or below examples where the tongue gesture comprises a swing tongue sideways gesture, a mouth floor tongue gesture, a curl back tongue gesture, or a tongue bite gesture.

Another example can include any of the above and/or below examples where the inertial sensor is provided in a virtual or augmented reality headset, earbuds, headphones, or a cochlear implant.

Another example can include any of the above and/or below examples where the method further comprises receiving one or more other signals from another sensor, wherein the detecting the tongue gesture is also based on the one or more other signals received from the another sensor.

Another example includes a method comprising instructing a user to perform a particular tongue gesture, measuring one or more motion signals from an inertial sensor while the user performs the particular tongue gesture, training a machine learning model to detect the particular tongue gesture using the one or more motion signals, and outputting the trained machine learning model.

Another example can include any of the above and/or below examples where the training is performed using supervised learning using the particular tongue gesture as a label for the one or more motion signals.

Another example can include any of the above and/or below examples where the inertial sensor comprises an accelerometer, a gyroscope, and a magnetometer.

Another example can include any of the above and/or below examples where the method further comprises performing principal component analysis on a moving time window of the one or more motion signals to extract one or more principal components and employing the one or more principal components to perform the supervised learning.

Another example can include any of the above and/or below examples where the machine learning model comprises a random forest that includes multiple decision trees.

Another example can include any of the above and/or below examples where the method further comprises providing moving windows of the principal components to individual decision trees of the random forest, determining a majority vote of the individual decision trees, and updating parameters of the random forest based at least on whether the majority vote matches the particular tongue gesture that the user was instructed to perform.

Another example can include any of the above and/or below examples where the method further comprises performing the training using training data for a plurality of users and performing individualized tuning of the trained machine learning model to at least two other users responsive to performance of the particular tongue gesture by the at least two other users.

Another example includes a system comprising an inertial measurement unit configured to provide motion signals, a processor, and a computer-readable storage medium storing instructions which, when executed by the processor, cause the system to detect a tongue gesture based at least on the motion signals and control an application based at least on the tongue gesture.

Another example can include any of the above and/or below examples where the system is provided in a virtual or augmented reality headset.

Another example can include any of the above and/or below examples where the inertial measurement unit is provided within a face gasket of the virtual or augmented reality headset.

Another example can include any of the above and/or below examples where the instructions provide a model configured to recognize the tongue gesture based on the motion signals.

Another example can include any of the above and/or below examples where the instructions, when executed by the processor, cause the system to display a plurality of items, scan over the plurality of items in response to eye gaze tracked by an eye tracking component, and in response to a specific tongue gesture detected while the eye gaze is directed to a particular item, select the particular item.

Another example can include any of the above and/or below examples where the instructions, when executed by the processor, cause the system to deselect the particular item responsive to another tongue gesture.

Another example can include any of the above and/or below examples where the inertial measurement unit is provided in headphones or earbuds.

Another example can include any of the above and/or below examples where the application comprises an audio-only application that does not use a visual display.

The invention claimed is:

1. A method comprising:
receiving one or more motion signals from an inertial sensor, the one or more motion signals received from the inertial sensor reflecting movement of a tongue of a user;
inputting the one or more motion signals to a machine learning model that has been trained to detect one or more tongue gestures;
receiving, from the machine learning model, an indication that a particular tongue gesture is detected from the one or more motion signals; and
outputting the particular tongue gesture to control an application.

2. The method of claim 1, wherein the particular tongue gesture comprises one or more taps on one or more front upper teeth by the tongue of the user.

3. The method of claim 1, wherein the particular tongue gesture comprises lateral movement of the tongue of the user, the lateral movement including a tap of a left or right cheek of the user.

4. The method of claim 1, wherein the particular tongue gesture comprises a swing tongue sideways gesture, a mouth floor tongue gesture, a curl back tongue gesture, or a tongue bite gesture.

5. The method of claim 1, wherein the inertial sensor is provided in a virtual or augmented reality headset, earbuds, headphones, or a cochlear implant.

6. The method of claim 1, further comprising:
receiving one or more other signals from another sensor; and
inputting the one or more other signals to the machine learning model, wherein the indication that the particular tongue gesture has been detected is also based on the one or more other signals received from the another sensor.

7. A method comprising:
instructing a user to perform a particular tongue gesture;
measuring one or more motion signals from an inertial sensor while the user performs the particular tongue gesture;
training a machine learning model to detect the particular tongue gesture using the one or more motion signals; and
outputting the trained machine learning model.

8. The method of claim 7, wherein the training is performed using supervised learning using the particular tongue gesture as a label for the one or more motion signals.

9. The method of claim 8, wherein the inertial sensor comprises an accelerometer, a gyroscope, and a magnetometer.

10. The method of claim 9, further comprising:
performing principal component analysis on a moving time window of the one or more motion signals to extract one or more principal components and employing the one or more principal components to perform the supervised learning.

11. The method of claim 10, wherein the machine learning model comprises a random forest that includes multiple decision trees.

12. The method of claim 11, further comprising:
providing moving windows of the principal components to individual decision trees of the random forest;
determining a majority vote of the individual decision trees; and
updating parameters of the random forest based at least on whether the majority vote matches the particular tongue gesture that the user was instructed to perform.

13. The method of claim 8, further comprising:
performing the training using training data for a plurality of users; and performing individualized tuning of the trained machine learning model to at least two other users responsive to performance of the particular tongue gesture by the at least two other users.

14. A system comprising:
an inertial measurement unit configured to provide motion signals reflecting movement of a tongue of a user;
a processor; and
a computer-readable storage medium storing instructions which, when executed by the processor, cause the system to:
input the motion signals reflecting the movement of the tongue of the user to a machine learning model that has been trained to detect one or more tongue gestures;
receive, from the machine learning model, an indication that a particular tongue gesture is detected from the motion signals; and
output the particular tongue gesture to control an application.

15. The system of claim 14, provided in a virtual or augmented reality headset.

16. The system of claim 15, wherein the inertial measurement unit is provided within a face gasket of the virtual or augmented reality headset.

17. The system of claim 14, wherein the instructions, when executed by the processor, cause the system to:
display a plurality of items;
scan over the plurality of items in response to eye gaze tracked by an eye tracking component; and
in response to the particular tongue gesture being detected by the machine learning model while the eye gaze is directed to a particular item, select the particular item.

18. The system of claim 17 wherein the instructions, when executed by the processor, cause the system to:
deselect the particular item responsive to another tongue gesture.

19. The system of claim 14, wherein the inertial measurement unit is provided in headphones or earbuds.

20. The system of claim 14, the application comprising an audio-only application that does not use a visual display.

21. The system of claim 14, wherein the machine learning model comprises a random forest that includes multiple decision trees.

* * * * *